United States Patent
Rayner et al.

(10) Patent No.: US 6,664,712 B2
(45) Date of Patent: Dec. 16, 2003

(54) ULTRASONIC MOTORS

(75) Inventors: Philip J. Rayner, Bedfordshire (GB); Roger W Whatmore, Bedfordshire (GB)

(73) Assignee: Cranfield University (GB)

(*) Notice: Subject to any disclaimer, the term of this patent is extended or adjusted under 35 U.S.C. 154(b) by 0 days.

(21) Appl. No.: 10/006,851

(22) Filed: Nov. 7, 2001

(65) Prior Publication Data

US 2002/0109433 A1 Aug. 15, 2002

Related U.S. Application Data

(63) Continuation of application No. PCT/GB00/01619, filed on May 8, 2000.

(30) Foreign Application Priority Data

May 7, 1999 (GB) .............................................. 9910483

(51) Int. Cl.⁷ .............................................. H01L 41/08
(52) U.S. Cl. .................................. 310/323.02; 310/328
(58) Field of Search ..................... 310/323.02, 323.04, 310/323.09, 328

(56) References Cited

U.S. PATENT DOCUMENTS

| | | | |
|---|---|---|---|
| 4,453,103 A | * | 6/1984 | Vishnevsky et al. ... 310/323.02 |
| 4,845,688 A | | 7/1989 | Butler |
| 5,233,257 A | | 8/1993 | Luthier et al. |
| 5,532,540 A | * | 7/1996 | Claeyssen et al. ..... 310/323.02 |
| 5,554,905 A | * | 9/1996 | Gschwind et al. ..... 310/323.02 |
| 5,729,077 A | | 3/1998 | Newnham et al. |
| 5,955,820 A | * | 9/1999 | Uchino et al. ......... 310/323.04 |
| 6,273,681 B1 | * | 8/2001 | Yamakawa et al. ........... 416/23 |
| 6,294,859 B1 | * | 9/2001 | Jaenker ....................... 310/328 |

FOREIGN PATENT DOCUMENTS

EP 0 537 446 A2 4/1993

* cited by examiner

*Primary Examiner*—Mark Budd
(74) *Attorney, Agent, or Firm*—Mathews, Collins, Shepherd & McKay, P.A.

(57) ABSTRACT

An ultrasonic motor is described which uses radial vibrations of an electro-active material disc (7) amplified by one or more flextensional diaphragms (6) to drive a rotor (4) pressed in frictional contact with the diaphragm (6) by a force imposed by a spring (3) or magentic attraction. The vibrations are converted by elastic fins (5) into rotary motion of the rotor (4). The motor can be operated in any resonant mode that generates vibration at the surface perpendicular to the contact area. Versions of the motor with one or two rotors are disclosed with the two rotor version being used to produce an output in the same direction or opposite directions.

31 Claims, 6 Drawing Sheets

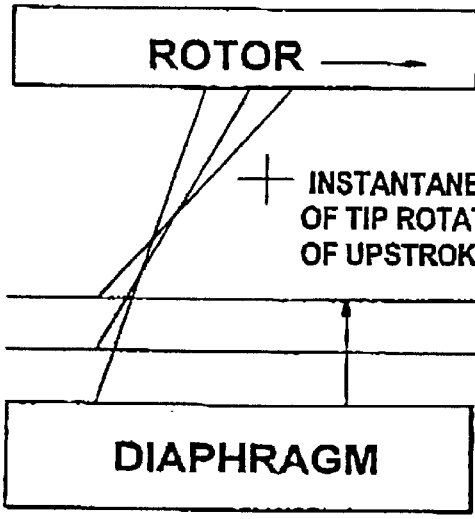 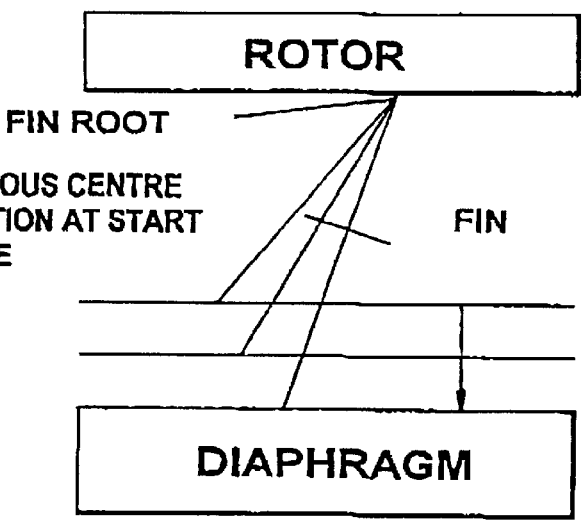
*Fig. 8A*  *Fig. 8B*
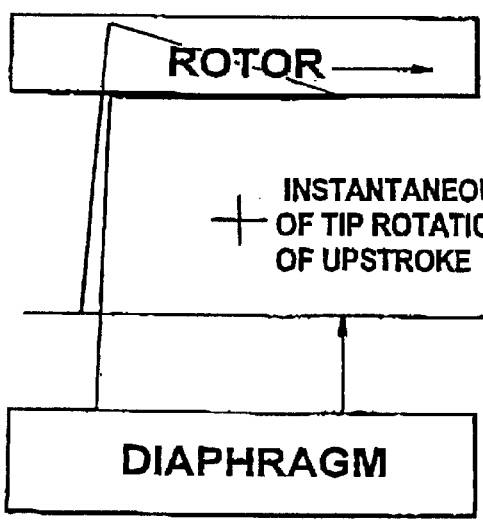 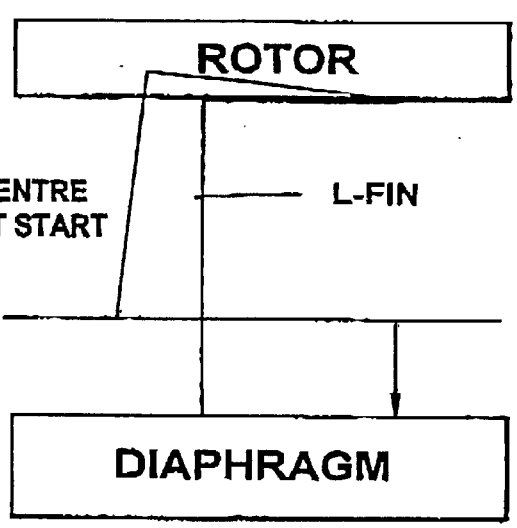
*Fig. 9A*  *Fig. 9B*

ULTRASONIC MOTORS

This application is a continuation of PCT/GB00/01619 filed May 8, 2000.

This invention concerns improvements in or relating to ultrasonic motors.

Ultrasonic motors produce high torque with a low maximum speed and have a high power and torque density. There are a large number of current designs but almost all designs require precision construction methods and so are expensive to make.

The present invention is intended to remedy this drawback. More particularly, the present invention seeks to provide an ultrasonic motor that can be made simply, with few components and at low cost.

According to the broadest aspect of the present invention there is provided an ultrasonic motor in which oscillating vibrations are converted into rotary motion through frictional contact at an interface between relatively rotatable components of the motor wherein one of the components comprises a disc of electro-active material and at least one flextensional displacement amplifier diaphragm for converting radial vibrations of the disc into oscillating vibrations of the or each diaphragm perpendicular to the plane of the disc.

The invented ultrasonic motor utilises one or two flextensional diaphragms as displacement amplifiers attached to the disc. These greatly increase the amplitude of vibrations and convert the radial vibrations of the disc into vibrations of the or each diaphragm perpendicular to the disc plane. Such flextensional amplifiers are used for sonar applications and for increasing the displacement given by electro-active displacement transducers. The innovative aspect of this design is that it converts the vibrations to rotational movement by a frictional push and release method.

Furthermore, the invented ultrasonic motor requires only a single electrical supply phase to drive it and has a positive braking torque with no power applied. The excitation of the disc in a radial mode gives a high electromechanical coupling factor producing an efficient and high power density ultrasonic motor. The high coupling factor also allows the use of a simple ac electrical drive without feedback to control frequency since the resonant bandwidth of the motor is large.

Preferably, the frictional contact is provided by a plurality of drive elements at the contact interface. In a preferred arrangement, the drive elements comprise elastic fins on one of the diaphragm(s) and an opposed rotor which are pressed into frictional contact with the other of the diaphragm and rotor. For example, the diaphragm and rotor may be urged towards each other by a spring force. Alternatively, the diaphragm and rotator may be urged towards each other by a magnetic attraction force.

Furthermore, this method of producing a rotary motion from a vibrating surface relies on a frictional contact between the tips of the elastic fins and the relatively moving surface, which is maintained with a positive contact pressure supplied by a spring or magnetic attraction. The fins impart a small displacement on the rotor, of the order of a few microns, on each upward stroke of the diaphragm then the fin retreats to return to its original position on the downward travel of the diaphragm's surface.

Embodiments of the invention will now be described in more detail, by way of example only, with reference to the accompanying drawings, wherein:

FIGS. 8a and 8b show schematically operation of the fin shown in FIGS. 1 and 2 for producing rotary motion at the rotor/diaphragm interface on the upstroke and downstroke of the diaphragm;

FIGS. 9a and 9b show schematically operation of an alternative L-shaped fin for producing rotary motion at the rotor/diaphragm interface on the upstroke and downstroke of the diaphragm;

Where appropriate, in the following description of the exemplary embodiments of ultrasonic motor according to the present invention, like reference numerals are used to indicate corresponding parts.

Figure 1:
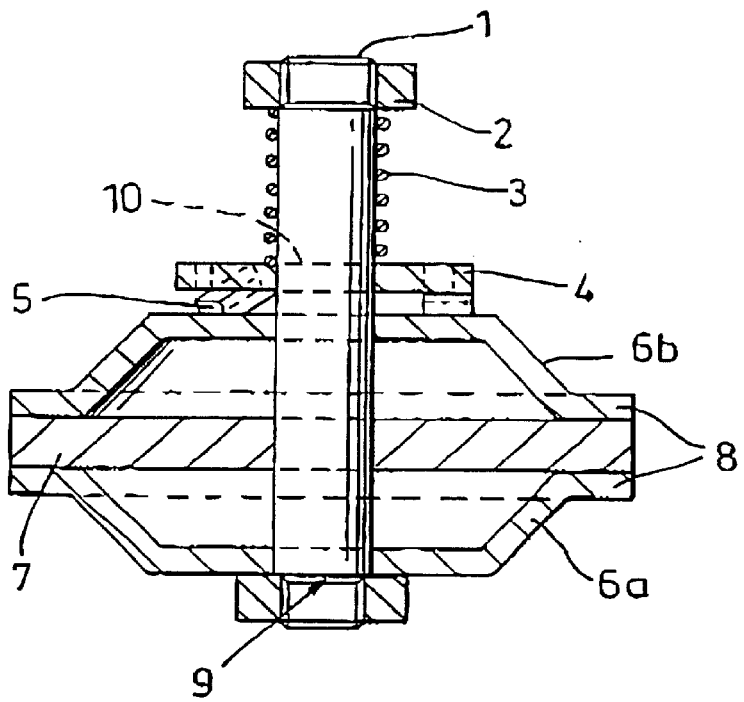
FIG. 1 shows in cross-section a first embodiment of an ultrasonic moor according to the invention having a single rotor.
Figure 2:
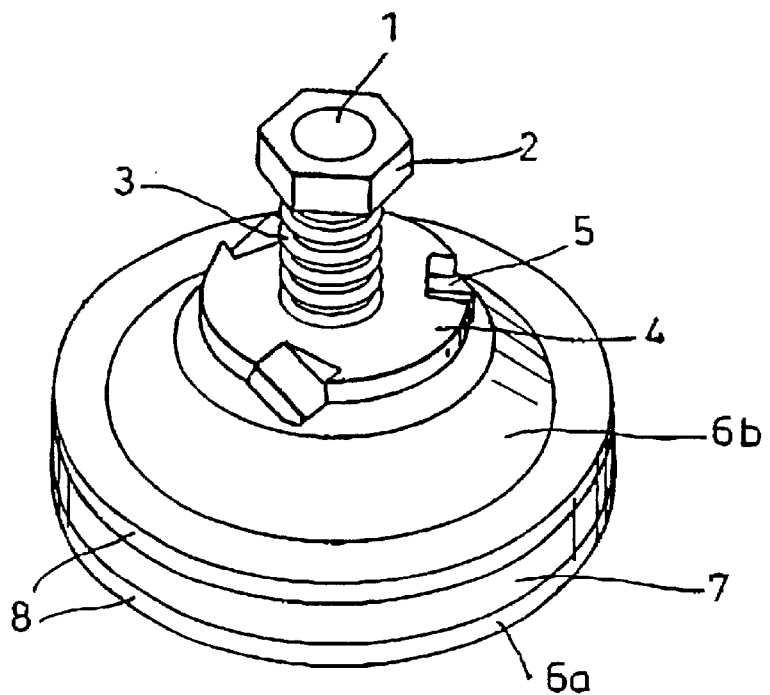
FIG. 2 is a perspective view from above of the motor shown in FIG. 1.

Referring first to FIGS. 1 and 2 of the accompanying drawings, an ultrasonic motor is shown having a stator comprising a disc 7 primarily constructed from an electro-active material with a respective flextensional amplifier diaphragm 6a,6b bonded to each face.

The disc 7 comprises a piezoceramic disc 2 mm thick and 25 mm outside diameter with a 4 mm internal diameter hole drilled centrally using a tungsten carbide drill. The disc 7 is a multi-layer construction with one or more layers of electro-active material interleaved with layers of conductive electrode material and is electroded with approximately 7 $\mu$m of fused silver and poled in the thickness direction.

The flextensional diaphragms 6a,6b are constructed of 0.5 mm discs of phosphor bronze PB 102 or 2% beryllium bronze, both low internal loss materials, wire electro-discharge machined to 25 mm outside diameter with a 4 mm internal diameter hole. The discs are shaped into the flextensional shapes with a two piece punch (not shown), turned to form the inside and outside surfaces of each diaphragm 6a,6b. A central locating pin (not shown) inserted through each disc aligns it to the forming punch which is loaded with 3 kN to form the diaphragm 6a,6b.

Each flextensional amplifier diaphragm 6a,6b has an exterior flange 8 bonded to the piezoceramic disc 7 with RS Circuit works silver loaded epoxy to make the electrical contact to the disc electrodes. At the same time an electrical input wire (not shown) is attached to each diaphragm 6a,6b with the same epoxy. The whole assembly is then baked at 60° C. for 10 minutes to cure the epoxy.

Extending through the aligned central holes in the disc 7 and flextensional amplifier diaphragms 6a,6b is an axle 1 providing a bearing 10 for a rotor in the form of a disc 4. The axle 1 comprises an M3×30 nylon bolt bonded at 9 to the diaphragm 6a with adhesive such as cyanoacrylate glue. The disc 4 is arranged opposite the other diaphragm 6b and is urged towards the diaphragm 6b by a helical spring 3 retained on the axle 1 by an M4 nut 2. The nut 2 is threaded on the axle 1 whereby the pre-load of the spring 3 can be adjusted.

The disc 4 has a 12 mm outside diameter with a 4 mm internal diameter central hole and is constructed from the same material as the flextensional amplifier diaphragms 6a,6b. The disc 4 has integral drive transmitting means in the form of three elastic fins 5 uniformly spaced in the circumferential direction and extending at an angle of 30° to the plane of the disc 4 for co-operating with the opposed diaphragm 6b. The fins 5 are formed by cutting and bending the material of the disc 4, for example by making wire electro-discharge machined cuts of L-shape.

To test the motor, the nut 2 was tightened to preload the spring 3 to 5N and the electrical input excited by a single phase, 0–100 kHz, ac supply at 15.7 kHz (fundamental resonant mode of diaphragm transducer), 48 kHz ($2^{nd}$ mode) and 82 kHz at a voltage of 40 Vrms. No extra friction layer was added to the planar surface of the stator.

Operation in the audio range at the fundamental resonant mode was tested, although the sound emission was unpleasant. Therefore, tests were carried out at resonant modes of the transducer with frequencies. Rotation of the rotors occurred within 500 Hz either side of the 48 kHz and 82 kHz resonance modes, corresponding with vibration modes giving orthogonal motion at the rotor/stator contact. The speed of rotation increased to a peak at the resonance frequency, corresponding to approximately 150 rpm at the 48 kHz mode and 250 to 300 rpm at the 82 kHz mode. Rotation also occurred at approximately 100 rpm at the 15.7 kHz mode.

As will be understood, the operation of the motor to produce a rotary motion from a vibrating surface relies on frictional contact at the interface between the disc 4 and the opposed diaphragm 6b which is maintained with a positive contact pressure supplied by the spring 3. More particularly, the fins 5 impart a small displacement on the disc 4, of the order of a few microns, on each upward stroke of the diaphragm 6b, then the fins 5 retreat to return to their original position on the downward stroke of the diaphragm 6b.

Figure 3:
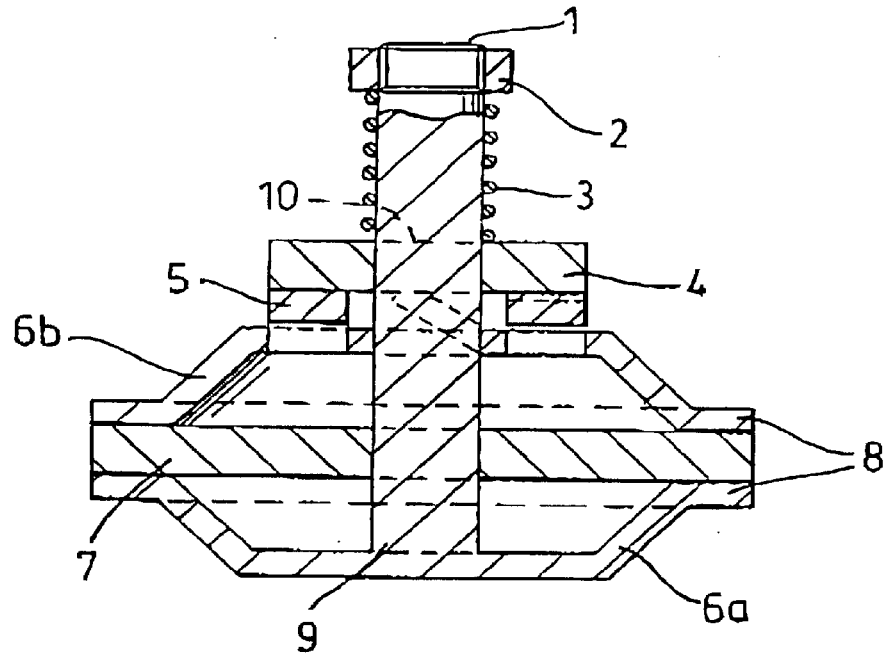
FIG. 3 is a cross-section similar to FIG. 1 showing a modification to the motor.
Figure 4:
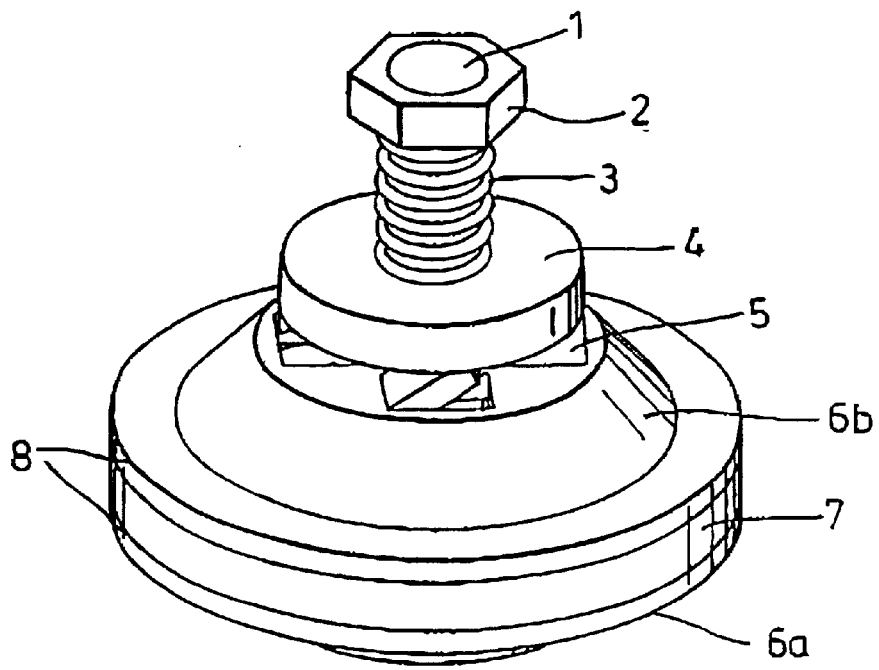
FIG. 4 is a perspective view from above of the motor shown in FIG. 4.

This operation is shown schematically in FIGS. 8a and bb. Each fin acts as a cantilever, bending elastically without sliding on the surface of the diaphragm due to the friction between the fin tip and diaphragm surface with the upward motion of the diaphragm, the contact force being the addition of the fin spring force and the acceleration of the rotor upwards. This friction drives the rotor horizontally. This side thrust is due to the instantaneous rotation of the tip about a point above the diaphragm surface, and not in line with the contact point in the direction of vibration, hence being dependent on the structure of the fin. This rotation point moves with the bending of the fin and movement of the rotor and is shown in FIG. 8a at the beginning of the upstroke of the diaphragm. On the downstroke of the diaphragm, the fin relaxes and the tip slides along the diaphragm surface as shown in FIG. 8b. The tip friction on the downstroke is much less than the upstroke since the contact force is due to the acceleration of the rotor deducted from the spring force of the fin The provision of two diaphragms, one on each side of the disc 7, with the axle 1 attached to one of the diaphragms effectively doubles the relative contact vibration at the interface. In a modification (FIGS. 3 and 4), the elastic fins 5 are integrally formed from the material of the diaphragm 6b opposite the disc 4. In another modification (not shown), only one diaphragm is provided and the axle 1 is attached to the disc 7.

Figure 5:
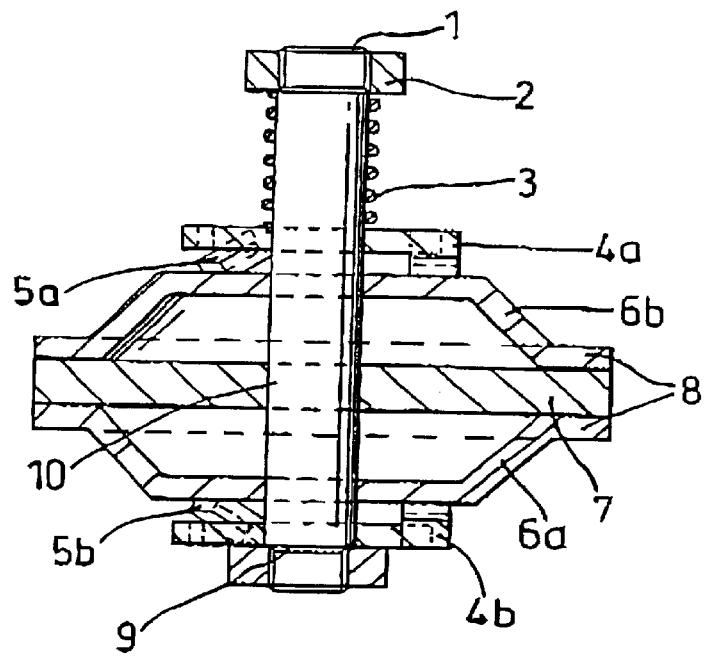
FIG. 5 shows in cross-section a second embodiment of an ultrasonic motor according to the present invention having two rotors.
Figure 6:
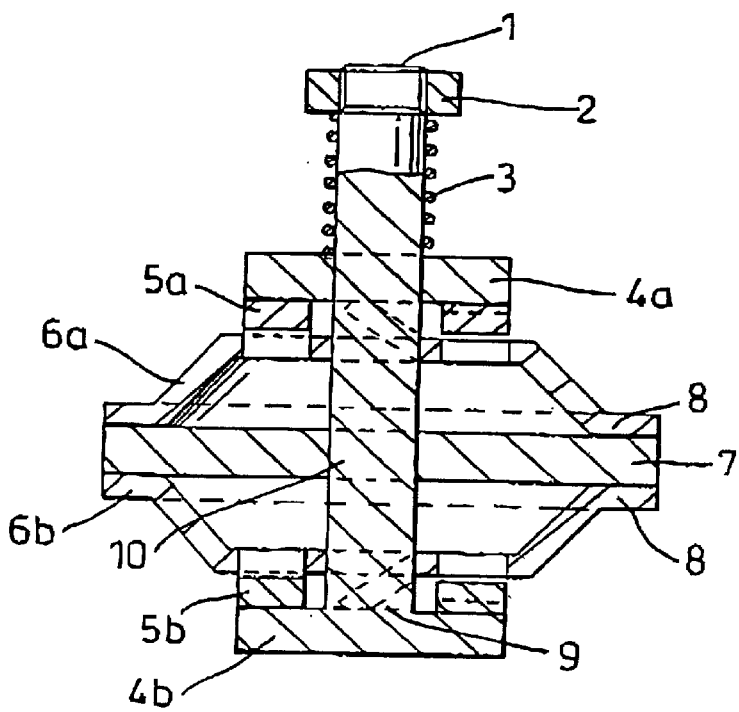
FIG. 6 is a cross-section similar to FIG. 5 showing a modification to the motor.

Referring now to FIG. 5, there is shown a second embodiment of ultrasonic motor in which two discs 4a,4b are provided, one opposite each diaphragm 6a,6b respectively with each disc 4a,4b having three integral elastic fins 5a,5b for co-operating with the associated diaphragm 6a, 6b. The rotor 4b is bonded at 9 to the axle 1 and the disc 7 provides a bearing 10 for the axle 1. For this, the disc 7 has a nylon bush (not shown) located in the central hole which allows movement of the axle 1 with the oscillating vibrations of the diaphragms 6a,6b. The operation of this embodiment is similar to the first embodiment above-described with oscillating movement of the diaphragms 6a,6b being converted to rotary motion of the rotors 4a,4b at the friction contact interfaces therebetween. In a modification (FIG. 6) the elastic fins 5a,5b are formed from the material of the diaphragms 6a,6b.

Figure 7:
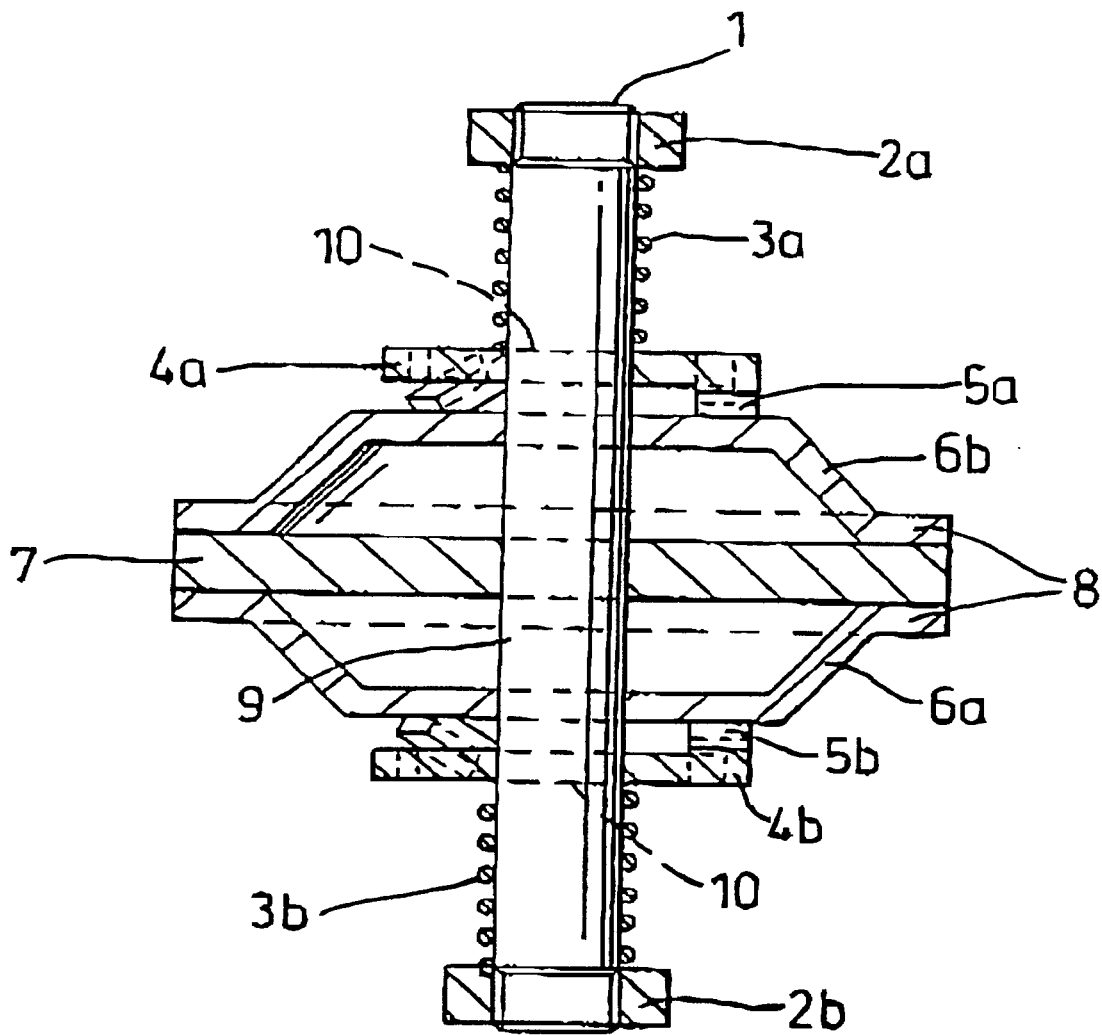
FIG. 7 shows in cross-section a third embodiment of an ultrasonic motor according to the present invention having two rotors.

With reference now to FIG. 7, there is shown a third embodiment of ultrasonic motor in which there are two discs 4a,4b, one opposite each diaphragm 6a,6b with each disc 4a,4b having three integral elastic fins 5a,5b for co-operating with the associated diaphragm 6a,6b. The axle 1 is bonded at 9 to the disc 7 and provides bearings 10 for both discs 4a,4b which are urged towards the associated diaphragm 6a,6b by a respective helical spring 3a,3b. Each spring 3a,3b is retained by a nut 2a,2b for independently adjusting the pre-load with thrust bearings (not shown) between the springs 3a,3b and the associated disc 4a,4b. With this arrangement, the discs 4a,4b can be rotated at different speeds and/or in different directions for the same level of vibration by altering the angle of the fins 5a,5b to the direction of vibration of the diaphragms 6a,6b. In this way, a bi-directional motor may be obtained. In a modification (not shown), the fins 5a,5b are provided by the diaphragms 6a,6b.

Figure 10:
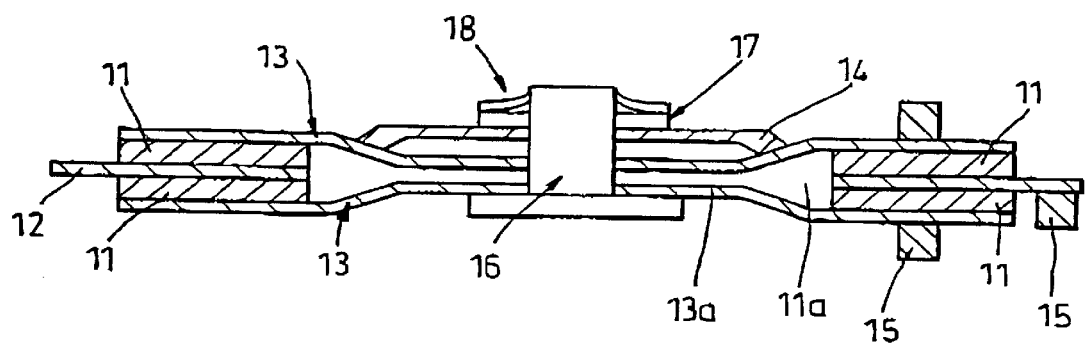
FIG. 10 shows in cross-section a fourth embodiment of an ultrasonic motor according to the present invention having one rotor.

Turning now to FIG. 10, there is shown a fourth embodiment of ultrasonic motor in which the thickness of the motor can be considerably reduced compared to the previous embodiments.

In this embodiment, a piezoceramic disc 11 is provided comprising an annular ring-like element having an enlarged central hole 11a in which upset, concave central regions 13a of flextensional amplifier diaphragms 13 are received. In this way, the operating region of the diaphragms 13 is contained inside the planes defined by the outer faces of the disc 11 reducing the overall thickness compared to the previous embodiments in which the central regions of the diaphragms are bent away from the disc 11.

The disc 11 is shown as two rings sandwiched together with a metal shim 12 forming an electrical contact. In these case, the two rings 11 are glued or otherwise fixed (for example by soldering) together with the metal shim 12 so that their positively (or alternatively negatively) poled faces are in contact with the metal shim.

A rotating component 14 is pressed in contact with one of the vibrating flextensional amplifier diaphragms 13. This is equipped with angled vanes or legs as described previously such that the vibrations of the flextensional amplifier diaphragm 13 causes the component 14 to rotate. The rotating component 14 is pressed in contact with the flextensional amplifier diaphragm 13 by a spring in this case shown as a spring clip 18 acting through a bearing 17, the whole assembly being held in place by a post arrangement 16 with electrical contact made at the point 15.

It will readily be appreciated that any of the modifications described previously for the other embodiments of this type of motor can be applied to this embodiment.

For example, two rotating components 14 can be used, one on each side of the vibrating disc and pressed against each flextensional amplifier diaphragm.

The piezoceramic disc 11 need not be made as two rings fixed together with a central shim contact, but can be a single ring with two outer contacts. Similarly, the piezoceramic disc 11 can be made as a plurality of thin piezoceramic layers with interleaved contacts, designed to vibrate as a single component.

In another variation (not shown), the components 14 bearing the vanes or legs referred to as "rotors" above can be held fixed, in which case the piezoceramic disc 11 will rotate. In this case the electrical driving power can be delivered by means of carbon bushes or other slip contacts.

Figure 11:
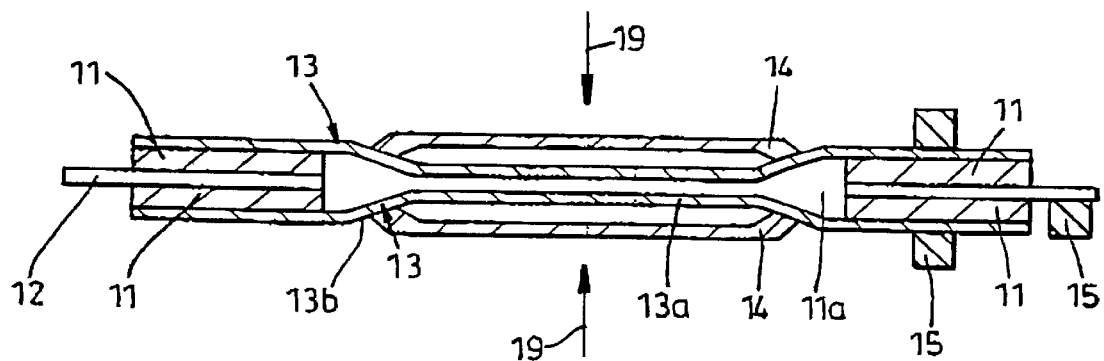
FIG. 11 shows in cross-section a fifth embodiment of an ultrasonic motor according to the present invention having two rotors.

In a fifth embodiment shown schematically in cross section in FIG. 11 the central post 16 of the previous embodiment is dispensed with. The two components 14 bearing the vanes are held fixed and press into contact with the flextensional amplifier diaphragms 13 by forces applied in the direction of the arrows 19. In this case the piezoceramic disc 11 becomes the rotating component.

The vanes are arranged to press against angled portions 13*b* of the amplifiers 13 such that they constrain the rotating piezoceramic disc 11 to rotate about a central axis perpendicular to the plane of the piezoceramic disc 11.

It will be understood that the invention is not limited to the embodiments above-described. Firstly, the stator disc material can be any active material that can produce ultrasonic vibrations by coupling a magnetic or electrical stimulus to mechanical strain, such as magnetostrictive, electrostrictive or piezoelectric materials. The diaphragms can be made from any elastic material having the required flextensional properties. However, materials with low internal damping, such as the bronzes above-described, are preferred.

Furthermore, there are variations in the method of attaching the or each diaphragm to the electro-active stator ring or disc. Adhesive bonding, such as the use of epoxies, conductive metal loaded epoxies or phenolic resins, soldering and other material bonding methods can be employed, depending on choice of electro-active material and elastic diaphragm material.

The geometry of the diaphragm and rotor combination can be optimised for different speed versus torque performance The shape, thickness and dimensions of the diaphragm will change the amount of amplification of the mechanical vibrations, the resonant frequency and force factor of the motor. Also, the number and/or inclination of the elastic fins can be altered from that described. Thus, increasing the number of fins will reduce contact pressure and wear while increasing the inclination of the fins will produce higher speeds and wear.

The elastic fins may have other shapes, which may give better efficiency, torque and/or power output. For instance an 'L' shaped fin with one end of the 'L' attached to the rotor or diaphragm and the other end driving against the friction interface will also give unidirectional rotation as shown in FIGS. 9*a* and 9*b* depicting the upstroke and downstroke of the diaphragm respectively. Similarly a curved fin would give rotation. The fins can be any elastic shape with a point which the point which contacts the friction interface rotates around when the diaphragm presses against the fin, where the said point of rotation is not in line with the contact point in the vibration's direction and is above the diaphragm's surface. This configuration will impart a horizontal displacement to the rotor once per the diaphragm vibration cycle. On the upstroke a horizontal friction force urges the rotor round as the diaphragm pushes the fin tip to the side, whereas on the downstroke much less force between the fin tip and diaphragm occurs, allowing sliding of the tip along the diaphragm surface.

The axle design has many parameters that affect operation of the motor. The axle can be free to turn relative to the diaphragm and electro-active material assembly, with a journal bearing surface in the centre of the stator disc such as the motors shown in FIGS. 5 and 6. Another design has an axle which passes through the flextensional assembly and is fixed to one diaphragm which adds the vibration of the diaphragms together to increase the speed and power of a single rotor which rotates about the axle contacting the free diaphragm such as the motors shown in FIGS. 1 to 4. Yet another design has the axle attached to the electro-active stator disc, with thrust bearings between each rotor's spring and the respective rotor such as the motor shown in FIG. 7.

The method of applying contact pressure between the rotors and diaphragms includes alternatives to the motor construction with reference to the spring assemblies shown. Firstly, the springs can be of many types apart from the helical coils shown, for instance dish or crinkle washers can be used to decrease the axial length of the spring assembly. Moreover, the springs can be removed by creating magnetic attraction between diaphragms and rotors by fabricating one of the set of components from a magnetic material, such as a ferrite, with a remnant magnetic polarisation, and the other set of components from a ferromagnetic material such as another remnant magnetic material, iron, nickel or cobalt or their alloys. Another variant uses an electromagnet to provide the magnetic attraction to hold the rotor(s) and diaphragm(s) in contact.

The rotor/stator contact can also be modified by inserting thin friction layers of elastic materials on the planar contact surface, such as polymer layers which are commonly used in present ultrasonic motors, to optimise the output efficiency and power of the motor.

Finally, an important modification that has potential benefits in the construction of a kinematic drive line is to hold the aforementioned 'rotors' stationary and allow the electro-active material and displacement amplifier diaphragm assembly to be the moving entity.

Other variations and modifications will be apparent to those skilled in the art and the invention is not intended to be limited to the specific embodiments above-described.

The invented ultrasonic motor has particular, but not exclusive application, where a motor which holds its position in the absence of supplied power would be desirable, for example toys, positioning applications such as central heating valves cameras (lens focusing, film winding—especially disposable cameras), electric windows etc.

What is claimed is:

1. An ultrasonic motor comprising:
   a disc of electro-active material (7,11) for producing radial vibrations;
   at least one flextensional displacement amplifier diaphragm (6*a*,6*b*,13) for converting the radial vibrations into vibrations of the diaphragm (6*a*,6*b*,13) perpendicular to the plane of the disc (7,11), the diaphragm mounted on the disk;
   a rotor (4,4*a*,4*b*,14) coupled to the diaphragm, the diaphragm vibrations then being converted into rotary motion via frictional contact at a diaphragm/rotor interface (6*b*/4,11/14);
   elastic fins (5,5*a*,5*b*) each having a fin tip which contacts the friction interface such that, the fin tip has an instantaneous rotation about a rotation point not in line with the fin tip contact point in the direction of rotation, thus causing a horizontal friction reaction which drives the rotor (44*a*,4*b*,14) on an expansive stroke of the amplifier (6*a*,6*b*,13), yet allows the fin to relax on a downstroke and the fin tip to slide on the friction interface.

2. An ultrasonic motor as recited in claim 1 wherein the disc of electro-active material (7,11) is a piezoelectric material having an electrode of a conductive material deposited on each circular face of the disc.

3. An ultrasonic motor as recited in claim 1 wherein the disc of electro-active material (7,11) is an electrostrictive material having an electrode of a conductive material deposited on each circular face of the disc.

4. An ultrasonic motor as recited in claim 1 wherein the disc of electro-active material (7,11) is a magnetostrictive material excited by an oscillating magnetic field.

5. An ultrasonic motor as recited in claim 1 wherein the disc of electro-active material (7,11) is of a multi-layer construction having at least one layer of electro-active material interleaved with layers of conductive electrode material.

6. An ultrasonic motor as recited in claim 1 wherein the diaphragm (6a,6b, 13) is bonded to the surface of the electro-active disc (7,11) with an epoxy or a metal loaded epoxy.

7. An ultrasonic motor as recited in claim 1 wherein the diaphragm (6a,6b,13) is bonded to the surface of the electro-active disc (7,11) with an anaerobic adhesive or modified anaerobic adhesive.

8. An ultrasonic motor as recited in claim 1 wherein the diaphragm (6a,6b,13) is soldered or diffusion bonded to the surface of the electro-active disc (7,11).

9. An ultrasonic motor as recited in claim 1 wherein a respective diaphragm (6a,6b) is attached to each side of the disc (7) and a single rotor (4) positioned opposite one of the respective diaphragms (6b) turns about an axle (1) which is attached to the other respective diaphragm (6a).

10. An ultrasonic motor comprising:
  a disc of electro-active material (7,11) for producing radial vibrations;
  at least one flextensional displacement amplifier diaphragm (6a,6b,13) for converting the radial vibrations into vibrations of the diaphragm (6a,6b,13) perpendicular to the plane of the disc (7,11), the diaphragm mounted on the disk;
  a rotor (4,4a,4b,14) coupled to the diaphragm, the diaphragm vibrations then being convened into rotary motion via frictional contact at a diaphragm/rotor interface (6b/4,11/14);
  wherein a respective diaphragm (6a,6b) is attached to each side of the disc (7) and a respective rotor (4a,4b) is arranged opposite each diaphragm (6a,6b) of which one rotor (4b) is attached to an axle and the other rotor (4a) can slide axially along the axle.

11. An ultrasonic motor as recited in claim 1 wherein an axle (1) is attached to the disc (7,11) and one or more rotors (4a,4b,13) turn about said axle (1) on bearings (10,17).

12. An ultrasonic motor comprising:
  a disc of electro-active material (7,11) for producing radial vibrations;
  at least one flextensional displacement amplifier diaphragm (6a,6b,13) for converting the radial vibrations into vibrations of the diaphragm (6a,6b,13) perpendicular to the plane of the disc (7,11), the diaphragm mounted on the disk;
  a rotor (4,4a,4b,14) coupled to the diaphragm, the diaphragm vibrations then being converted into rotary motion via frictional contact at a diaphragm/rotor interface (6b/4,11/14);
  wherein one or more rotors (4a,4b,14) are held in contact with the oscillating surfaces of the diaphragm by magnetic attraction brought about by the rotors (4a,4b,14) having a remnant magnetic polarization and the diaphragms (6a,6b,13) being made of ferromagnetic materials, such as the metals Iron, Nickel or Cobalt or their alloys.

13. An ultrasonic motor comprising:
  a disc of electro-active material (7,11) for producing radial vibrations;
  at least one flextensional displacement amplifier diaphragm (6a,6b,13) for converting the radial vibrations into vibrations of the diaphragm (6a,6b,13) perpendicular to the plane of the disc (7,11), the diaphragm mounted on the disk;
  a rotor (4,4a,4b,14) coupled to the diaphragm, the diaphragm vibrations then being converted into rotary motion via frictional contact at a diaphragm/rotor interface (6b/4,11/14);
  wherein one or more rotors (4a,4b,14) are held in contact with the oscillating surfaces of the diaphragm by magnetic attraction brought about by the diaphragms (6a,6b,13), having a remnant magnetic polarization and the rotors (4a,4b,14) being made of ferromagnetic materials, such as the metals Iron, Nickel, or Cobalt or their alloys.

14. An ultrasonic motor comprising:
  a disc of electro-active material (7,11) for producing radial vibrations;
  at least one flextensional displacement amplifier diaphragm (6a,6b,13) for converting the radial vibrations into vibrations of the diaphragm (6a,6b,13) perpendicular to the plane of the disc (7,11), the diaphragm mounted on the disk;
  a rotor (4,4a,4b,14) coupled to the diaphragm, the diaphragm vibrations then being converted into rotary motion via frictional contact at a diaphragm/rotor interface (6b/4,11/14);
  wherein one or more rotors (4a,4b,14) are held in contact with the oscillating surfaces of the diaphragm by magnetic attraction brought about by an electromagnet winding.

15. An ultrasonic motor as recited in claim 1 wherein one or more rotors (4a,4b,14) are held in contact with the diaphragms (6a,6b,13) by one or more springs.

16. An ultrasonic motor as recited in 1 wherein the displacement amplifier diaphragm (6a,6b,13) and the disc (7,11) assembly rotates about the rotor (4a,4b,14).

17. An ultrasonic motor as recited in claim 1 wherein the displacement amplifier diaphragm (6a,6b,13) and the disc (7,11) assembly is stationary.

18. An ultrasonic motor as recited in claim 1 wherein a layer or structure of an elastic material is attached to at least one of the surfaces of the rotor/diaphragm interface (5,5a, 5b).

19. An ultrasonic motor as recited in claim 1 wherein the elastic fins (5,5a,5b) make contact at an oblique angle to the surface of the friction interface between the rotating component and the diaphragm (6a,6b,13) of the stationary component.

20. An ultrasonic motor as recited in claim 1 wherein the elastic fins (5,5a,5b), which make contact with the friction interface, have one or more curved sections in their length.

21. An ultrasonic motor as recited in claim 1 wherein the elastic fins (5,5a,5b), which make contact with the friction interface, have at least two straight sections that are joined in at an angle.

22. An ultrasonic motor as recited in claim 1 wherein the diaphragm (6a,6b,13) is dish-shaped having an upset central region.

23. An ultrasonic motor as recited in claim 22 wherein the central region is spaced from the plane of the disc.

24. An ultrasonic motor as recited in claim 22 wherein the central region (13a) is contained within the plane of the disc.

25. An ultrasonic motor as claimed in any preceding claim wherein the or each flextensional amplifier diaphragm is dish-shaped with an upset central region.

26. An ultrasonic motor as claimed in claim 25 wherein the central region is spaced from the plane of the disc.

27. An ultrasonic motor as claimed in claim 25 wherein the central region is contained within the plane of the disc.

28. An ultrasonic motor as recited in claim 1 wherein the diaphragm vibrates primarily in an axial direction.

29. An ultrasonic motor as recited in claim 1 wherein the disc has an annular shape.

30. An ultrasonic motor as recited in claim 1 wherein the fins are attached to the rotor.

31. An ultrasonic motor as recited in claim 1 wherein the fins are attached to the diaphragm.

* * * * *